United States Patent [19]

Tomimoto et al.

[11] 4,370,673
[45] Jan. 25, 1983

[54] SIGNAL GENERATOR FOR A COLOR TELEVISION TRANSMITTING SYSTEM

[75] Inventors: Tetsuo Tomimoto, Osaka; Yoshitomi Nagaoka, Neyagawa; Reiichi Sasaki, Yawata; Hiroshi Oyama, Hirakata, all of Japan

[73] Assignee: Matsushita Electric Industrial Co., Ltd., Osaka, Japan

[21] Appl. No.: 218,012

[22] Filed: Dec. 18, 1980

[30] Foreign Application Priority Data

Dec. 20, 1979 [JP] Japan .................................. 54-166507

[51] Int. Cl.$^3$ ............................................ H04N 9/535
[52] U.S. Cl. ........................................ 358/21 R; 358/16
[58] Field of Search ...................... 358/21, 12, 16, 32

[56] References Cited

U.S. PATENT DOCUMENTS 3,002,050  9/1961  Richman .............................. 358/21

*Primary Examiner*—Richard Murray
*Attorney, Agent, or Firm*—Wenderoth, Lind & Ponack

[57] ABSTRACT

A signal generator for a color television transmitting system improves the picture quality when color encoded signals are reproduced in the picture displayed by a conventional color television receiver. The system utilizes a primary color level detector, a color-difference level detector, and a luminance signal producer which outputs a luminance signal in response to the difference between the primary color level signal output from the primary color level detector and a color-difference level signal output from the color-difference level detector. The output luminance signal is then utilized in the transmission of a color television signal so that a conventional color television receiver may display a color picture having an improved quality.

7 Claims, 4 Drawing Figures

SIGNAL GENERATOR FOR A COLOR TELEVISION TRANSMITTING SYSTEM

BACKGROUND OF THE INVENTION

This invention relates to a signal generator (color encoder) for a color television system. An object of the invention is an improvement in the picture quality when color encoded signals are reproduced in the picture displayed by a usual color television receiver.

FIG. 1 is a block diagram representing a flow of signal processing at a conventional encoder and a usual television receiver, wherein in a transmitter 1, primary color signals R, G and B are converted by a matrix circuit 3 into a luminance signal. The primary color signals are also given to a matrix circuit 4 to produce color-difference signals R-Y and B-Y, the color-difference signals being fed to a modulator 5 and modulated thereat to be output as a chrominance subcarrier. The chrominance subcarrier is passed through a band pass filter 6 and added to the luminance signal at an adder 7 to be fed to a transmission line 8 as a composite color TV signal. A receiver 2 separates the luminance signal and chrominance subcarrier from the composite color TV signal through a band pass filter 9 and feeds the luminance signal and chrominance subcarrier to an amplifier 10 and a modulator 11 respectively, the demodulator 11 demodulating the chrominance subcarrier to produce a color-difference signal. At a matrix circuit 12, the luminance signal output from the amplifier 10 is added to the color-difference signals R-Y, G-Y and B-Y to produce primary color signals R, G and B and send them to a color picture tube (not shown).

In the above-noted conventional color television system, the bandwidth of chrominance subcarrier is narrower than that of luminance signal. Especially at the receiver side, the bandwidth of the color difference signal obtained by the demodulation of the chrominance subcarrier is about 500 KHz, which is extremely narrow in comparison with the luminance signal bandwidth of 3 MHz or 4 MHz, resulting in the following defect in picture quality.

The defect is that brightness reproduced on the picture has distortion with respect to its original brightness. Such a phenomenon is caused by a cooperative effect of due to the fact that the color picture tube used for the receiver has a non-linear characteristic generally called a γ-characteristic and due to the fact that the bandwidth of color-difference signal is narrow. In other words, if the color picture is high in color saturation, the brightness information reproduced on the picture is influenced by the receiver's γ-characteristic and is transmitted from the color-difference signal channel as from the well as luminance signal channel. A narrow bandwidth color-difference signal channel cannot accurately reproduce the original brightness information at the picture edge of a saturated color, and the brightness often decreases.

Such phenomenon is exemplarily shown in FIG. 2, in which the luminance actually reproduced on the picture tube in response to transient signals of so called color bar is illustrated. The axis of ordinate in FIG. 2 represents relative luminance to the normalized white luminance level, and the axis of abscissa a time period, only a transient response period being shown. As seen from FIG. 2, the transient signal of color bar generally produces a "luminance trough". At the transient period from the green to magenta, the "luminance trough" is particularly larger. This is the reason for a readily appearing dark part at the boundary of green and magenta when the color bars are displayed by the receiver. Such a luminance distortion which is formed during the transient period of a color picture is a defect in the conventional color television system.

SUMMARY OF THE INVENTION

An object of the invention is to provide a means to eliminate the aforesaid defect without changing the circuit system at the color television receiver. Such an object is obtained by a signal generator comprising a primary color level detector for producing primary color level signal of the level substantially equal to a sum of squared primary color signals, a color-difference level detector for being supplied with wideband color-difference signals corresponding to the primary color signals, and for producing a color-difference level signal of a level which is substantially equal to a sum of squared low frequency components in the wideband color-difference signal, and a luminance signal producer for generating a luminance signal in response to both the primary color level signal and the color-difference level signal.

BRIEF DESCRIPTION OF THE DRAWINGS

Next, the invention will be detailed with aid of the accompanying drawings, in which.

DESCRIPTION OF THE PREFERRED EMBODIMENT

Luminance $L_o$ of an original picture designated by primary color signals R, G and B is given by the following formula:

$$L_o = l_R R^\gamma + l_G G^\gamma + l_B B^\gamma \qquad (1)$$

where γ: gamma coefficient of a color picture tube, and $l_R$, $l_G$ and $l_B$: primary color tristimulus values.

The luminance given in the above-noted formula is of essential high-fidelity. One object of the invention is to merely change the system at the transmitting side, thereby reproducing correct luminance at the color television receiver.

If the luminance signal for this purpose is expressed by $Y_M$ and color-difference signals each by $(R-Y)_M$, $(G-Y)_M$ and $(B-Y)_M$, the luminance reproduced on the picture of a receiver is given in the following formula:

$$L = l_R\{Y_M + (R-Y)_M\}^\gamma + l_G\{Y_M + (G-Y)_M\}^\gamma + l_B\{Y_M + (B-Y)_M\}^\gamma \qquad (2)$$

assuming L is equal to $L_o$ (assuming a high-fidelity luminance reproduction performance), a desired luminance signal $Y_M$ is obtained by the formulas (1), (2) as follows:

$$Y^2_M = l_R R^2 + l_G G^2 + l_B B^2 - \{l_R(R-Y)^2_M + l_G(G-Y)^2_M + l_B(B-Y)^2_M\} \qquad (3)$$

where $\gamma \simeq 2$ and $l_R(R-Y) + l_G(G-Y) + l_B(B-Y) = 0$ are applied. In formula (3), when $(R-Y)_M$, $(G-Y)_M$ and (B-Y)$_M$ are equal to R-Y, G-Y and B-Y respectively (corresponding to assumed wide band transmission system of the color-difference signal), Y$_M$=Y is obtained, which is equal to the luminance signal by the conventional system.

Color-difference signals (R-Y)$_M$, (G-Y)$_M$ and (B-Y)$_M$ in formula (3), mean the low frequency components in the wideband color-difference signal respectively. By receiving the luminance signal satisfying formula (3), a receiver can display a high-fidelity picture having the same luminance as the original picture. The formula (3) represents an approximated luminance signal which is effective for practical use of the invention, but the invention is not limited to systems using formula (3). In other words, this invention includes all signal generators for color television systems that transmit luminance signals as Y$_M$, to make L$_o$ and L expressed in formulas (1) and (2) substantially equal.

Figure 1:
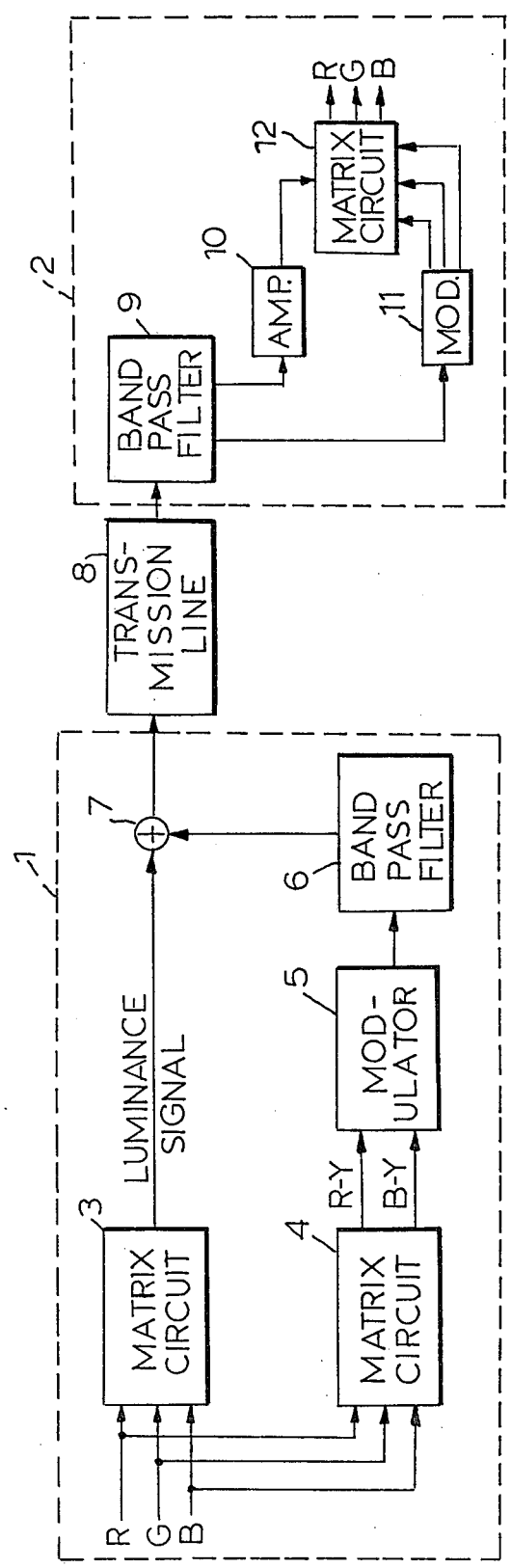
FIG. 1 is a block diagram of a conventional example.
Figure 2:
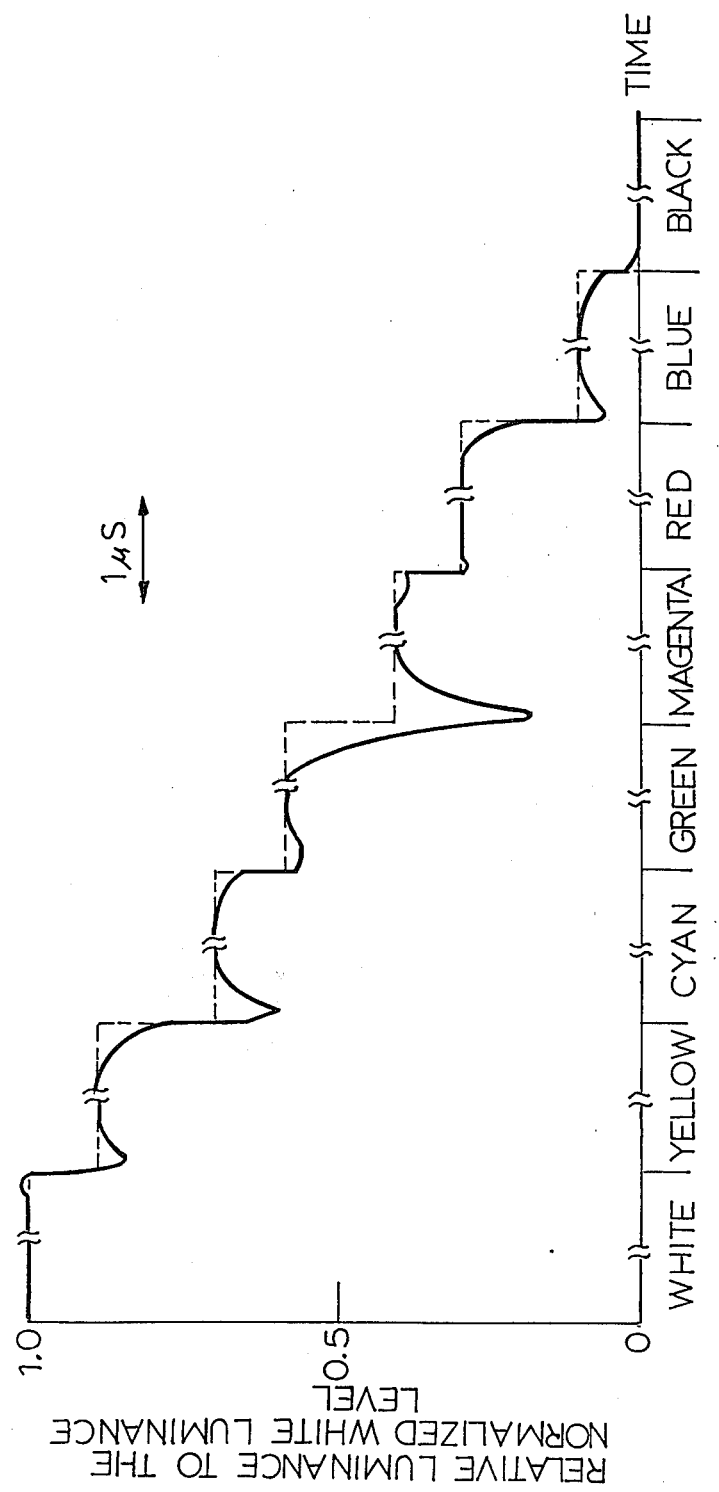
FIG. 2 is a graph explanatory of a defect thereof.
Figure 3:
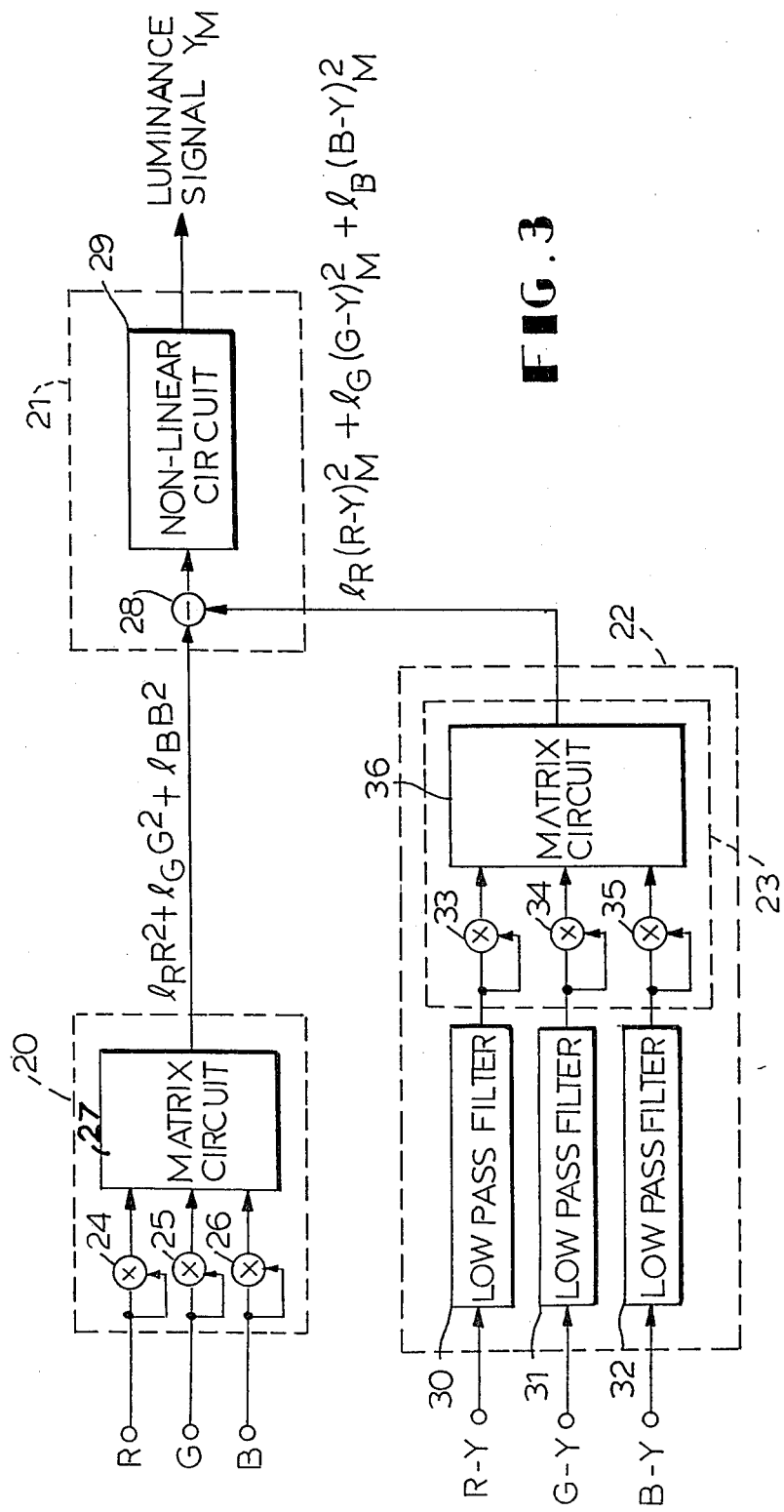
FIG. 3 is a block diagram of an embodiment of the invention.

FIG. 3 is a block diagram of an embodiment of the invention, in which primary color signals R, G and B are given to multipliers 24, 25 and 26 respectively. The multipliers 24, 25 and 26 generate squared signals having substantially equal levels to the primary color signals respectively, whereby the multipliers 24, 25 and 26 alternatively may be replaced by other non-linear circuits of the same effect. The squared signals are fed into a matrix circuit 27 and added thereat to produce the primary color level signal. These elements 24 to 27 thus constitute a primary color level detector 20. In a case that the primary color signal is a digital signal having a level only of "1" or "0", the primary color level signal can be expressed by $l_R R + l_G G + l_B B$ and becomes the same signal as the conventional luminance signal, thereby requiring no multipliers 24, 25, 26. Such a primary color level detector is also included in the present invention.

On the other hand, wideband color-difference signals R-Y, G-Y and B-Y are given to low-pass filters 30, 31 and 32, and the low frequency components are extracted thereat. The low frequency components of the color-difference signals are fed to a square sum circuit 23, in which the color-difference level signal of the level substantially equal to the sum of squared low frequency components is produced. Alternatively, the square sum circuit 23 may include multipliers 33, 34 and 35 which generate squared signals of low frequency component of each color-difference signal, and a matrix circuit 36 generating color-difference level signal by adding the squared signals in a certain proportion. These elements 30 to 36 thus constitute a color-difference level detector 22.

The primary color level signal and color-difference level signal are given to a subtractor 28, in which the difference signal between the two signals is produced and fed to a non-linear circuit 29. The non-linear circuit 29 produces signal of the level substantially equal to a square root of the difference signal level, the signal being output as luminance signal, and the circuit 29 is readily constructed by use of, for example, diodes and resistances. In order to realize the effect of the invention to a minimum, the non-linear circuit 29 may be neglected. A luminance signal output from a luminance signal producer 21, including the subtractor 28 and non-linear circuit 29, is substantially equal to the luminance signal Y$_M$ satisfying the formula (3), whereby the usual television receiver can reproduce pictures of high quality and free from luminance distortion.

Figure 4:
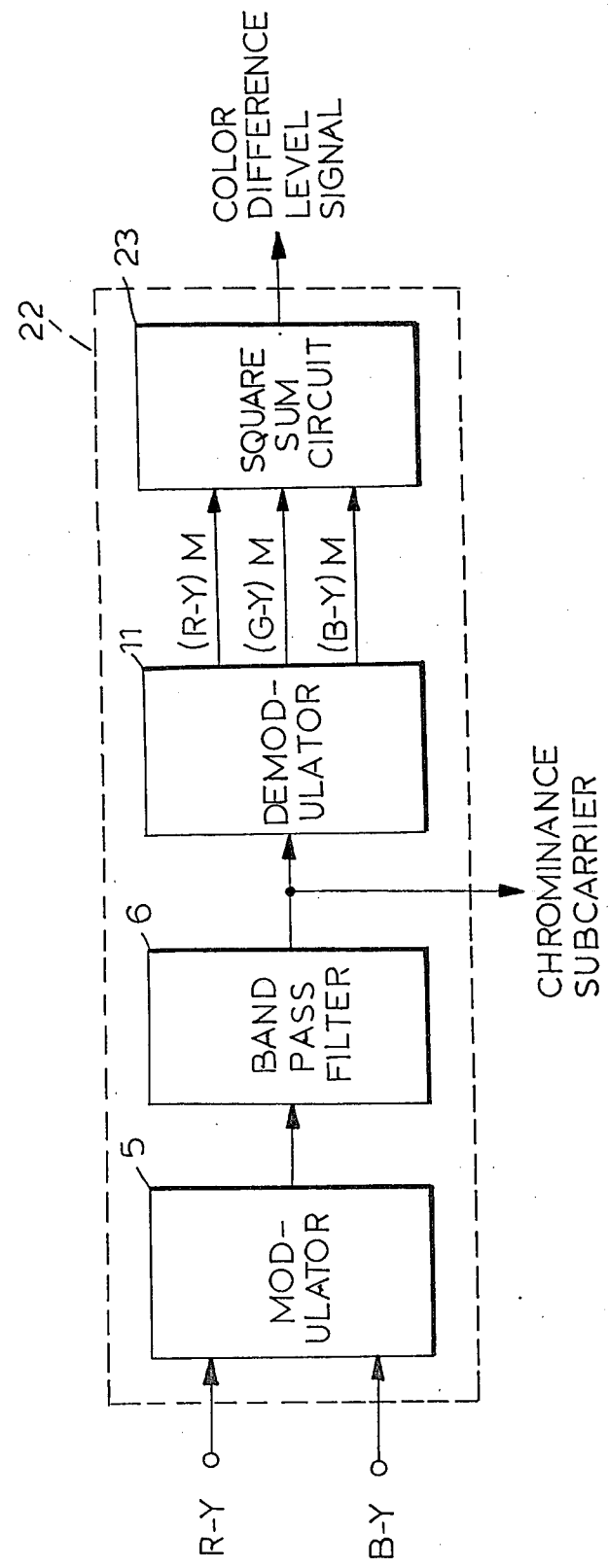
FIG. 4 is a block diagram of another exemplary construction of a color-difference level detector applicable to the present invention.

FIG. 4 shows a modified embodiment of the color-difference level detector 22, in which color-difference signals R-Y, B-Y are given to a modulator 5 and transformed to a phase and amplitude modulated signal, and thereafter limited in bandwidth by a band-pass filter 6. The modulated signal limited in bandwidth is substantially equal to a usual chrominance subcarrier, which is synchronously demodulated by a demodulator 11 to output the low frequency components (R-Y)$_M$, (G-Y)$_M$ and (B-Y)$_M$ of color-difference signals.

The aforesaid modulator 5, band-pass filter 6 and demodulator 11 may be equivalent to those used in the conventional example. The low frequency components of color-difference signals are fed to the square sum circuit 23 to thereby produce thereat a color-difference level signal of the level substantially equal to the sum of squared low frequency components.

The embodiment of the invention materializes function corresponding to the low-pass filter in the color-difference level detector by use in common of the modulator and band-pass filter used in the conventional encoder, thereby being effective to simplifying the circuit.

As seen from the above, this invention is effective to basically decrease the luminance distortion found in the conventional color television transmitting and receiving system without any change in the television receiver, thereby having an extremely large effect.

What is claimed is:

1. A signal generator for a color television transmitting system which has a narrower bandwidth color-difference signal channel than a luminance signal channel, said signal generator comprising:

a primary color level detector, which is supplied with primary color signals representative of red, green and blue levels of a picture, for substantially respectively squaring said primary color signals, and for adding said squared signals together, and for outputting a primary color level signal representative of a luminance of a picture;

a color-difference level detector, which is supplied with wideband color-difference signals representative of red, green and blue chrominance levels of a picture, for extracting low frequency components of said color-difference signals, and for respectively squaring said low frequency components, and for adding said squared low frequency components together, and for outputting a color-difference level signal representative of a luminance component conveyed by said color-difference signal;

a luminance signal producer, which is supplied with said primary color level signal and said color-difference level signal, for outputting a luminance signal in response to the difference between said primary color level signal and said color-difference level signal.

2. A signal generator for a color television transmitting system according to claim 1, wherein said luminance signal producer comprises a subtractor which subtracts said color-difference level signal from said primary color level signal to detect a difference signal, and a non-linear circuit which is supplied with said difference signal, said non-linear circuit producing a signal having a level which is substantially equal to a square root of said difference signal level to thereby output said produced signal as said luminance signal.

3. A signal generator for a color television transmitting system according to claim 1, wherein said luminance signal producer includes a subtractor for outputting as said luminance signal a difference signal between said primary color level signal and said color-difference level signal.

4. A signal generator for a color television transmitting system according to claim 1, wherein said primary color level detector includes at least one multiplier for generating a squared signal substantially equal to the square of said primary color signal, and a matrix circuit which adds each of said squared signals to generate said primary color level signal.

5. A signal generator for a color television transmitting system, according to claim 1, wherein said primary color level detector is arranged such that said primary color signals are added in a certain proportion to thereby produce said primary color level signal.

6. A signal generator for a color television transmitting system according to claim 1, wherein said color-difference level detector includes a low pass filter for removing low frequency components from said wideband color-difference signals, and a square sum circuit for producing a signal substantially equal to the squared sum of the low frequency components of said color-difference signals.

7. A signal generator for a color television transmitting system according to claim 6, wherein said low pass filter includes a modulator for outputting a phase and amplitude modulated signal by said wideband color-difference signal, a bandpass filter for limiting the bandwidth of said phase and amplitude modulated signal, and a demodulator which demodulates said bandlimited signal to extract the low frequency components from said color-difference signals.

* * * * *